United States Patent [19]
Ellenby et al.

[11] Patent Number: 5,682,332
[45] Date of Patent: Oct. 28, 1997

[54] VISION IMAGING DEVICES AND METHODS EXPLOITING POSITION AND ATTITUDE

[75] Inventors: John Ellenby; Thomas Ellenby; Peter Ellenby, all of San Francisco, Calif.

[73] Assignee: Criticom Corporation, San Francisco, Calif.

[21] Appl. No.: 335,912

[22] Filed: Nov. 8, 1994

Related U.S. Application Data

[63] Continuation-in-part of Ser. No. 119,360, Sep. 10, 1993.
[51] Int. Cl.⁶ ............................................. G06T 17/00
[52] U.S. Cl. ................................ 364/559; 395/135; 345/7
[58] Field of Search ................................. 364/443, 449, 364/559, 578, 424.02; 395/118, 125, 127, 135, 133, 129; 345/7, 8, 9; 348/115; 359/52

[56] References Cited

U.S. PATENT DOCUMENTS

| | | | |
|---|---|---|---|
| 4,970,666 | 11/1990 | Welsh et al. | 395/126 |
| 5,311,203 | 5/1994 | Norton | 345/7 |
| 5,353,134 | 10/1994 | Michel et al. | 359/52 |
| 5,394,517 | 2/1995 | Kalawsky | 395/129 |

*Primary Examiner*—Emanuel T. Voeltz
*Assistant Examiner*—M. Kemper
*Attorney, Agent, or Firm*—Page Lohr Associates

[57] ABSTRACT

Vision systems having knowledge of position and attitude can reliably determine what scenes are being addressed by the system. Real images of the scene can then be augmented with computer generated information which relates to the known scene. A determination of position and attitude of the device identifies which scene is being addressed. A computer recalls information regarding the scene and generates imagery according to that recalled information. The computer generated imagery is then combined with an image of the scene to form an augmented image which is presented to the user aligned to the viewing direction of the device.

5 Claims, 4 Drawing Sheets

VISION IMAGING DEVICES AND METHODS EXPLOITING POSITION AND ATTITUDE

BACKGROUND OF THE INVENTION

This application is a continuation-in-part application from the earlier filed application having a Ser. No. 08/119,360 filed on Sep. 10, 1993.

This invention relates generally to vision systems and relates specifically to devices for viewing a scene which have the ability to augment that scene with computer generated information. We very specifically acknowledge the invention of Kent Norton set forth in U.S. Pat. No. 5,311,203. For all discussion presented here it is assumed that "skilled in the art" necessarily means the reader has a complete understanding of the disclosure set forth in the above-identified Norton patent. No attempt is made to teach again that which was well presented in Norton. However, many good and useful improvements to that invention have now been discovered. Accordingly, the inventors of those improvements now seek a Letters Patent therefore.

A study of the art yields many good instruments which are used to as vision systems and in particular, used to augment real images. Sylvester teaches of an astronomical instrument in U.S. Pat. No. 2,754,597 that is equipped with a means whereby a heavenly body may be selectively viewed together with means for identifying said body and various locations relative to the heavenly bodies. The good invention of Meisenheimer in U.S. Pat. No. 2,99.4,971 allows one to view a constellation with augmentation, for example names and pointers to interesting features of the constellation, via a simple image combiner device. It is interesting to note the possibility of combining the concepts of Meisenheimer with those of the recent invention of Saunders U.S. Pat. No. 5,252,950. As Meisenheimer relies on the length of ones arm to scale two images, Saunders provides a dynamic scaling of the display image. Regardless of the distance from the user's eye, the image is properly scaled. George et al recent invention set forth in U.S. Pat. No. 5,133,050 shows a telescope operating system operable for combining graphics generated from a data base with images from the telescope. The system relies on recognition of a reference star and thereafter generates a star map for the region of concern. Japanese patent #0226787 where Matsumoto shows a very interesting concept of augmenting a real image by optically combining the video of a CRT with a real object/scene.

As mentioned, the invention by Norton is a sophisticated device which provides advantages over other devices including those herein mentioned above. It automatically identifies what the instrument is addressing by measuring the pointing attitude of the instrument and a sidereal time. In this way, the instrument "knows" what it is looking at and can recall, based on that knowledge, appropriate image data from a data base and generate a data image to be projected along a viewers line of sight.

Two major limitations can be found in Norton: firstly, as Norton relies on the sidereal time to locate objects relative to the device, it is only possible for the device to operate on those objects which move predictably with sidereal time. Objects which are far from earth having an angular position which varies with time but where the actual position of the device on earth has negligible effect on the angular position; and secondly, the optical arrangement is designed only for a very specific scenario and has many restrictions associated therewith. There are many other limitations in Norton which have been considered and overcome by systems of the instant invention.

The Norton device is specifically designed for viewing objects far from the device, in particular stellar objects or, according to Norton: "objects in the night sky". Because it is an object of the Norton device to identify objects within the scene being addressed, certain mechanisms are employed to measure conditions which allow this identification. Specifically, the pointing attitude of the device and a sidereal time. Because the cosmos generally move in a predicable manner, if one determines a sidereal time and direction of viewing then one can conclude with great accuracy which heavenly bodies may be within a predetermined field-of-view. Indeed this is exactly how Norton determines which objects may be within the field-of-view. Because the sidereal time is different than the local time for various locations about Earth, Norton makes a provision for calibrating the time for the local position of the instrument. With these measurements, Norton then generates an image specific to the scene being addressed. That generated image is then projected into a user's eye.

Norton relies on the fact that the angular relationship between all objects of the cosmos is always known with respect to a position on Earth. Barring asteroids and some comets which may behave in unpredictable ways, it is possible to predict which objects may appear within a certain field-of-view simply by pointing the device toward the night sky. All of the objects of concern to the Norton device move with respect to Earth in a predictable way. Earth bound objects would be impossible to locate in this fashion as their angular position with respect to the instrument does not depend on the sidereal time. With knowledge of the sidereal time and pointing attitude one can locate space objects with certainty. Earth objects cannot be located this way and devices of Norton are primarily for astronomical applications.

In addition to the limitation of use for space objects, the device of Norton also suffers from very problematic optical limitations. An image is generated and is projected into a beam which is combined with a second beam traveling along the line of sight of the Norton device shown in FIG. 1. It is important to note that the Norton device does not form an image of the space objects but instead superimposes two beams of light. An image of the objects in space is formed by the lens of the user's eye. The user's eye sees the computer generated image which appears to be coincident with the real scene. This optical arrangement is clumsy and requires many very special conditions to be operative. For example, as it is impossible to adjust the intensity of the light from the real scene, the intensity of the generated image must be compatible therewith. This limits the device to night use. In addition, optical alignment of two optical systems is a non-trivial matter. The beam combiner of Norton is subject to alignment problems which are not easily resolvable. As the beam of light from the real scene passes through the optics of the device, there is little or no opportunity to manipulate that beam. Image processing is typically done in a digital domain. The image of the real scene is not formed until the light passes into the user's eye. Therefore it is not possible or is extremely difficult to process the image of the real scene. It may be possible in Norton's device to include a Polaroid or neutral density filter to operate on the input beam, but these operations are fairly crude forms of image processing as are most other processing which can be done in the optical domain. The device of Norton may only be useful for fixed magnification as a zoom function would have to be installed into both optical trains complicating the device.

Many other limits exist and the Norton device is not considered to be very versatile because these restrictions require that its use be directed to a very specific application.

SUMMARY OF THE INVENTION

Now we wish to extend the benefits of augmenting a real scene with computer generated imagery to applications not anticipated by Norton. These include for example, Earth objects, daytime use, near field, dynamic range and others. In addition, an arrangement is proposed which allows for very sophisticated image processing manipulations of the real scene and single or multiple objects therein. The devices are operable for near field applications as well as astronomical or infinite fields. These devices have magnification options, have range versatility, and are highly mobile and electronically sophisticated.

In direct comparison to Norton, certain devices of the present invention identify scene and objects within scenes being addressed via a device position and attitude measurement. Sidereal time is of no concern to these devices. By knowing the location and pointing direction of an imaging system that is addressing a scene, the scene and objects therein can be identified. For example, a person on top of the World Trade Center in New York City looking south-southwest could find the Statue of Liberty in the scene; a person in Long Beach, Calif. looking south could be looking at Catalina Island; a person in Turin, Italy looking north could find Matterhorn Mountain. If an observer's position and viewing direction are known, it is possible to predict with some accuracy which objects may be within the scene. After identifying a scene being addressed by the vision imaging system, a computer could generates image information particular to that scene. Such image information could be combined with an optically acquired digital image to finally produce a composite image. Measurements of position and attitude can locate Earth bound objects with reasonable reliability. Although it may not be possible to locate highly mobile Earth objects like cars or pedestrians in this fashion, buildings, mountains, et cetera, which remain fixed with respect to their location on Earth can be sufficiently located.

Since manipulation of images is greatly simplified in an electrical domain compared to manipulation of optical beams, we propose here that great advantages can be realized using a new electro-optic arrangement of system components. An electronic camera having an optical axis defines a viewing direction. A display oriented with its normal direction colinear with the viewing direction provides a user interface. In devices of Norton, a user looks through the device and focuses on infinity. In devices of the present invention, a user focuses in the near field on a display aligned to the scene being addressed.

An image of the scene being addressed is formed by the camera and converted to an electronic signal. That electronic signal can be processed in many ways including: deletion of unwanted objects, colorization, contrast and edge enhancement, other well known image processing techniques but in particular by augmentation with image information generated by a computer having knowledge of a scene being addressed. A final image is presented at the display to appear as if the user is looking at the scene.

In accordance with these descriptions, it is a primary object of the invention to provide a vision system having augmented images. It is also an object of the invention to provide a vision system which identifies a scene being addressed with device position and attitude measurements. It is a further object to provide a vision system having augmented images of Earth bound subjects. It is a further object to provide a vision system having augmented images where the images of real scenes and computer generated imagery are combined electronically.

BRIEF DESCRIPTION OF THE DRAWING FIGURES

DESCRIPTION OF THE PREFERRED EMBODIMENTS

In preferred versions of the invention the mechanisms for identifying a scene rely on position and attitude measurements. In addition, preferred versions provide for sophisticated electronic combination of optically acquired digital images with computer generated images.

Since objects on Earth move with respect to each other in a manner completely independent of sidereal time, sidereal time is not useful for identifying a scene containing Earth objects. Instead, a scene containing objects on Earth can be identified by determining the position and attitude of a viewing device which is addressing that scene. For example, a viewing device positioned on Alcatraz Island in San Francisco Bay and pointing in a westerly direction could be addressing a scene containing the Golden Gate Bridge. Therefore, to a limited extent, knowledge of ones position and viewing direction may yield hints of what a scene is comprised. The limited extent depends in part on how reliably certain objects remain stationary. The Golden Gate Bridge can be relied on to remain in the same location from day to day. Cars on the bridge cannot be anticipated using position and attitude measurements as they are highly mobile and change position rapidly.

Figure 1:
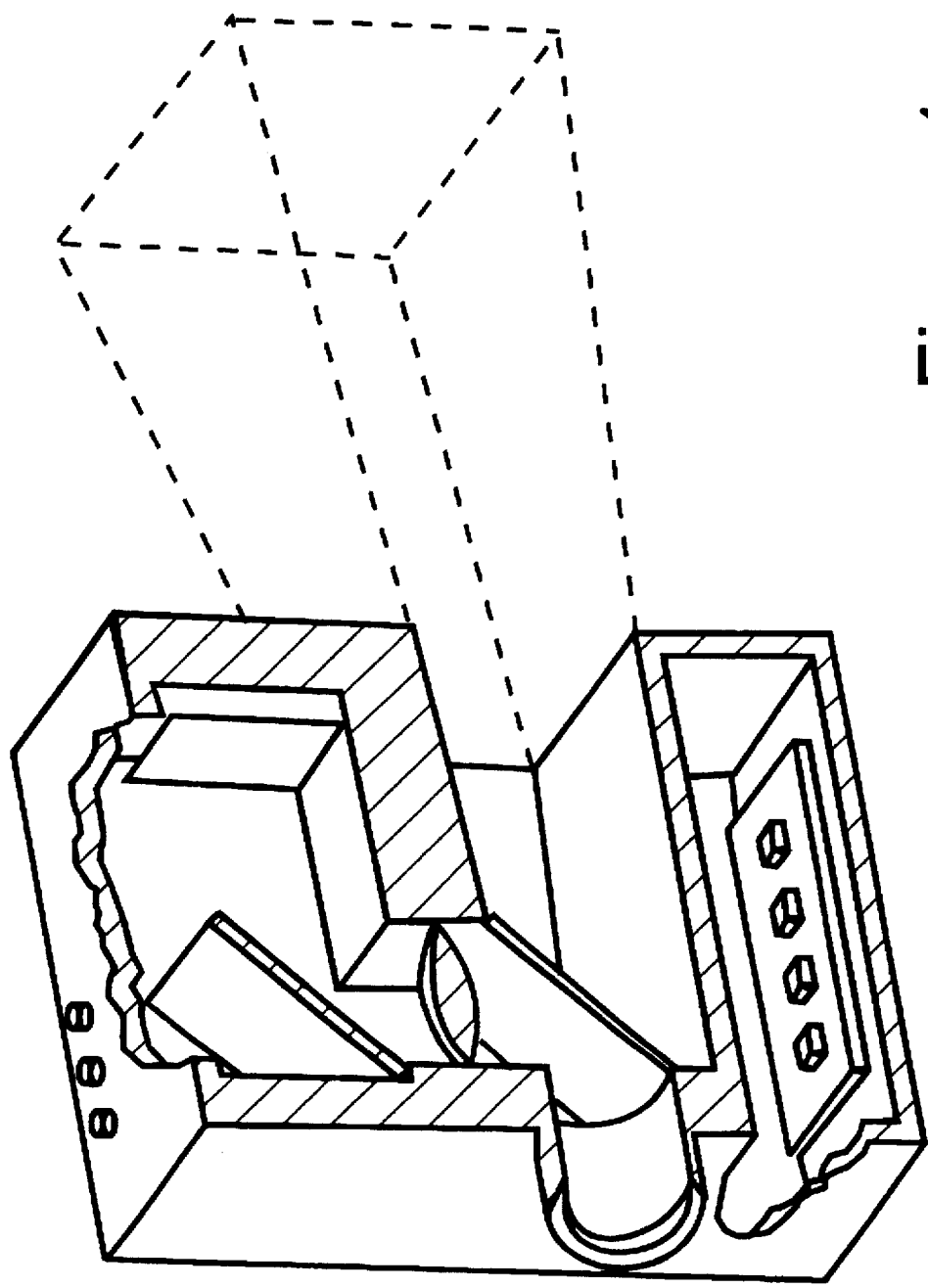
FIG. 1 is a prior art drawing of an apparatus for viewing a night sky.
Figure 2A:
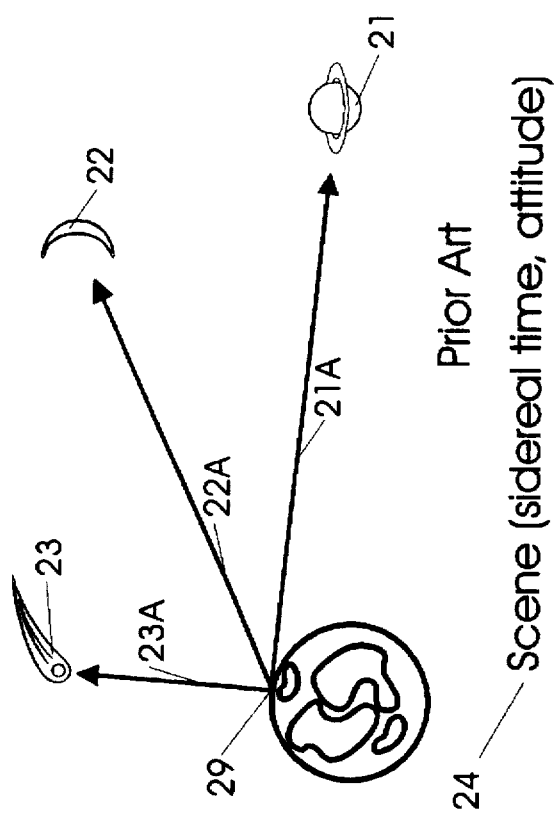
FIGS. 2A and 2B illustrate graphically the difference between how an Earth scene and space scene are identified with different scene identifiers: $Scene_{Earth}$ {position attitude} and $Scene_{space}$ {time, attitude}.
Figure 2B:
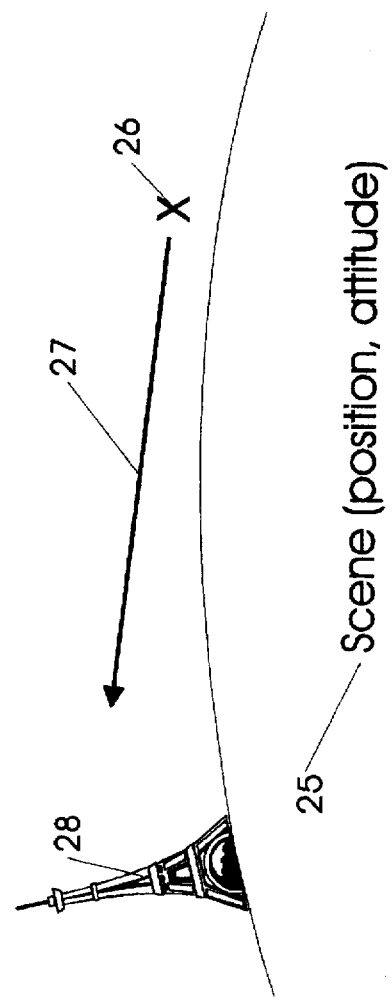
Figure 3:
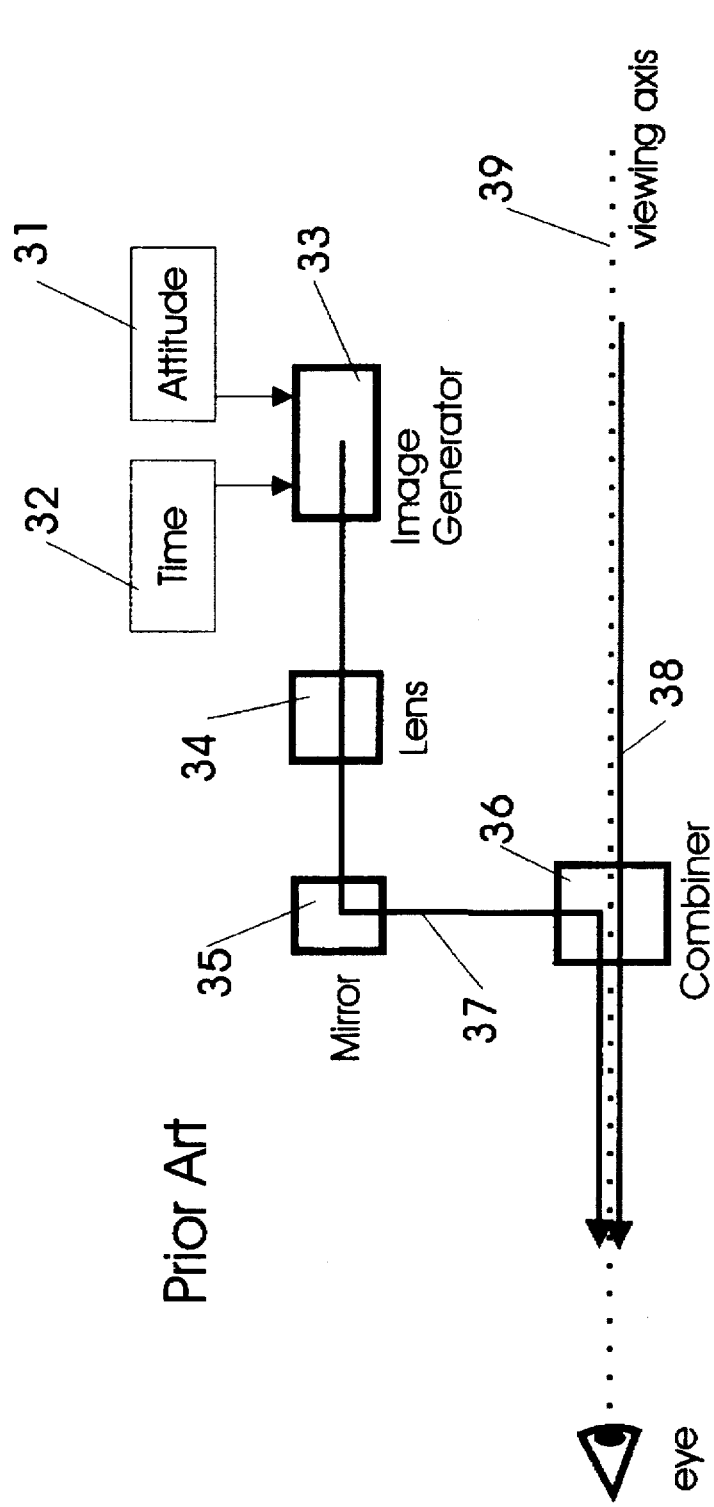
FIG. 3 is a block diagram of some aspects of the prior art.

A detailed comparison is further illustrated in FIGS. 2A and 2B. A fixed position 29 has associated therewith a local sidereal time. Because planet rotation is well known and very consistent, the locations of other planets 21 are easily determinable. The direction indicated by arrow 21A therefore represents a pointing direction or attitude which would assure the planet be in the field-of-view of a Norton device. Even a moon 22 which revolves around a planet at a high frequency compared to another planet could be completely located 22A by measurements of attitude and sidereal time. Comets 23 also move in a manner predictable in sidereal time and are perfectly located 23A by determining an attitude and local sidereal time. In contrast, a viewing device at a position fixed on the Earth's surface 26 looking in a direction 27 toward an object on Earth 28 would not benefit from a sidereal time measurement as the objects move together in sidereal time. However, the position and attitude can be used to uniquely identify a scene. A scene of objects in space perfectly identified by the identifier 24 $Scene_{space}$ {time, attitude}, a scene of objects on Earth are identified by the identifier 25 $Scene_{Earth}$ {time, attitude}

Although Norton can expect great certainty in the determination of which objects are within a field-of-view due to the fact that objects in space rarely change, the viewing system of the invention suffers from some measure of uncertainty. While position and attitude measurements are quite good for locating certain objects, many others cannot be located in this way. For this reason, imaging systems of the invention address a scene, acquire an optical image, convert the optical image to an electronic image, measure the position and attitude of the device, determine which objects may be within the scene, generate imagery relating to those objects, combine the optically acquired image with the computer generated image to form and augmented image, and then display the image to a user.

Addressing a scene means that the viewing axis of the device which is defined by the symmetry axis of an electronic camera lens is pointed in the direction of some scene. Acquiring a optical image means that light entering the camera is imaged by a lens onto a focal plane and converted to an electronic signal. The attitude of the viewing axis or the camera pointing direction is measured with a device such as an electronic compass or gyro. The position of the device can be determined by various position measurement schemes. For global applications, preferred devices may use the Global Positioning System GPS. Other applications may rely on sophisticated interferrometric techniques or simple mapping methods. In accordance with the measurements of position and attitude, a computer makes predictions as to the objects which may be within the field-of-view of the camera or within the scene being addressed. If the position of the device is measured to be on Alcatraz Island and the pointing attitude is west, then the computer can conclude that the Golden Gate Bridge is within the scene and a model of the bridge which was previously recorded into memory can be recalled. The computer then determines preferred image features like scale and color for the optically acquired image and the computer generated image and combines the two images into a single image. The composite image is then displayed on a display device having its normal direction aligned with the viewing direction.

In review, with device position and attitude measurements, a computer can make predictions regarding objects within a scene and provide simulation of those objects which can then be combined with real images of the scene. Determination of a viewing device's position and attitude is sufficient to locate objects stationary with respect to the Earth's surface. Determination of a viewing device's attitude and local sidereal time is sufficient to locate objects in space.

Image processing techniques which combine computer generated images with images of real scenes could demand many sophisticated operations. For this reason, it is not preferable to perform the combination in the optical domain. Optical beams carrying optical images are extremely difficult to manipulate in the image processing sense. Instead, great flexibility and processing power can be realized if images are first converted to an electronic form and combined in the digital domain. This includes image processing in general but more importantly, image processing as it relates to combining images of real scenes with images generated by a computer which relate to particular real scenes.

In a second and equally important improvement, we have now devised a way to more efficiently manage the images and combination of images of the viewing device. Norton uses very cumbersome optical beam combiner techniques to present a combination of two images to a user. It is extremely difficult to manage beam manipulations including but not limited to: alignment, intensity, feature extraction, feature enhancement, filtering, etc. We now propose a system which first converts the real scene to a digital image. This digital image then can be processed for proper intensity, dynamic range, and feature enhancement properties. Feature and object recognition techniques are known for the optical analog domain, however those systems are very specialized and are not well suited for the present invention. Since data is conveniently stored in a digital format, the computer generated image originates as recorded information in a data store. According to conditions of use, that information can be processed into an image or a portion thereof. The combination of images then can take place according to rules of a computer routine to finally arrive at an augmented image. Where the devices of Norton are dearly directed to instruments designed for the superposition of optical beams, the best devices of the present invention are specifically directed to computer combination of digital images, an image of a real scene is combined with data from a data store to form an augmented image to be presented to a user.

Figure 4:
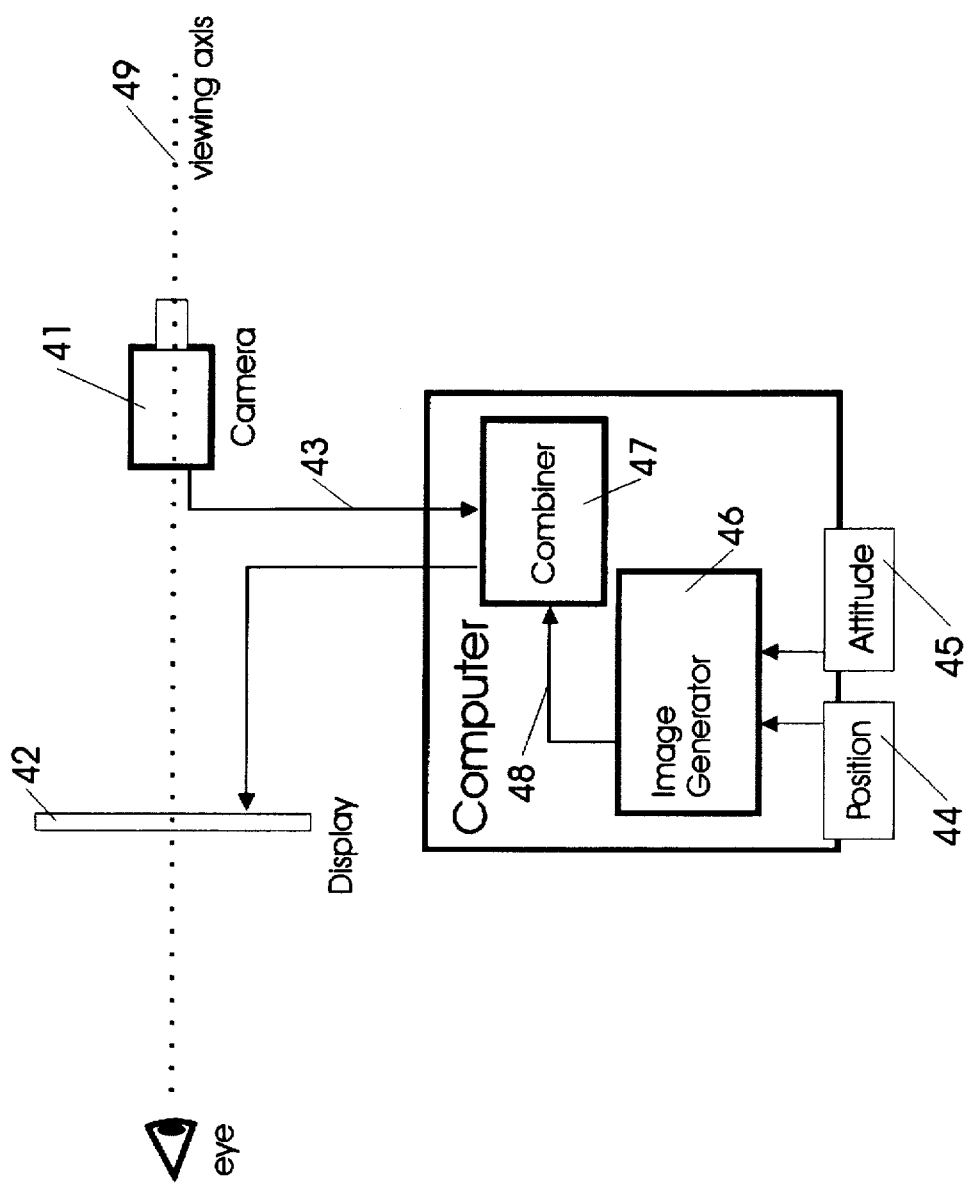
FIG. 4 is a comparison block diagram showing related aspects of the present invention.

In devices of Norton, the computer determines time 32 and pointing attitude 31 generates 33 an image; and immediately converts it to an optical beam 37; which is then passed through optics 34 to make the image appear at infinity; and then passed to a mirror 35; to a beam combiner 36 where it is combined with second optical beam 38 containing image information of a real scene and propagating along a viewing axis 39; that beam is then projected into a user's eye. As the beam which contains information regarding the real scene is only passed through a combiner, there is little or no chance for image processing like beam intensification, magnification, or other process. In contrast, FIG. 4 shows an arrangement where a camera 41 and a display 42 are aligned to a viewing axis 49. Electronic images are transmitted 43 to a computer having an electronic image combiner 47. Measurements of position 44 and attitude 45 stimulate an image generator 46 which provides computer generated graphics and imagery relating to the scene being addressed as predicted by the computer and transmits 48 this information to the combiner 47. A composite image is then presented at the display aligned with its normal direction along the viewing axis.

To combine two beams into a single viewing path is task enough without consideration to manipulating the beans for enhancement of the final combined image. The Norton equipment is particularly useful for astronomical purposes because the "Night Sky" has very high contrast and very low intensity. These properties are useful for combining optical beams. However, Norton points out the failure of the system when the optical path of the real scene suffers a double reflection through the lens system, a very simple optical manipulation. Because applications of the present invention anticipate being very processing intensive, images of the real scene and images generated by the computer are converted to the digital domain. At final presentation, they are again converted to a photon image. This provides great opportunity to manipulate the images in the computer. Pattern recognition, image enhancement, feature subtraction, edge enhancement, etc., all can operate on the information of the real scene and of the data from the data base. In addition, routines which operate to combine these images in a preferred way are possible. For example, if undesirable information exists in the real scene, it can simply be eliminated and replaced with data from extrapolation or from the data base. As brightness concerns and dynamic range considerations are made in the front end (camera), any conditions of the real scene can result in useful images. This includes the dark night sky and bright daylight of a baseball park.

In review, combiners which superimpose optical beams are very cumbersome and do not facilitate beam manipulation. Very sophisticated image processing hardware and software can provide significant advantages to systems which combine one or more related images.

Although the present invention has been described in considerable detail with reference to certain preferred versions thereof, other versions are possible. Therefore, the spirit and scope of the appended claims should not be limited to the description of the preferred versions contained herein.

We claim:

1. An apparatus for viewing a scene comprising: a camera; a position determining means; an attitude determining means; a computer; and a display.

the camera having a lens and transducer for converting an optical image of a scene into an electronic signal, the lens having a symmetry axis which defines a pointing direction of the camera;

the position determining means being operable for determining the position of the camera;

the attitude determining means being operable for determining the attitude of the camera pointing direction;

the computer operable for receiving an image signal from the camera and further operable for generating images relating to the position and attitude of the apparatus and operable for combining those images into a composite image and transmitting a composite image signal to a; display having a normal direction aligned with and colinear with the camera pointing direction.

2. An apparatus of claim 1, said position determining means being further operable for determining the position of the camera with respect to an arbitrary reference.

3. An apparatus of claim 1, said position determining means being further operable for determining the global position of the camera as determined by a global positioning system.

4. An apparatus of claim 1, said attitude determining means being an electronic compass operable for measuring the pointing direction of the camera over a 4-pi steradian solid angle range.

5. An apparatus of claim 1, wherein said generating images relating to the position and attitude further comprises: recalling from a memory location associated with said position and attitude determinations information relating to the scene being addressed.

* * * * *